US012676789B2

(12) United States Patent
Singer et al.

(10) Patent No.: US 12,676,789 B2
(45) Date of Patent: Jul. 7, 2026

(54) SELF-ADAPTIVE HEALTH MONITORING SYSTEMS INCLUDING NETWORKS OF TENSOR NETWORKS

(71) Applicant: THE REGENTS OF THE UNIVERSITY OF MICHIGAN, Ann Arbor, MI (US)

(72) Inventors: David Singer, Ann Arbor, MI (US); Alexander Manohar, Ann Arbor, MI (US); Connor Arrigan, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 71 days.

(21) Appl. No.: 18/941,966

(22) Filed: Nov. 8, 2024

(65) Prior Publication Data

US 2025/0158878 A1 May 15, 2025

Related U.S. Application Data

(60) Provisional application No. 63/597,921, filed on Nov. 10, 2023.

(51) Int. Cl.
| | |
|---|---|
| *H04L 41/08* | (2022.01) |
| *H04L 43/10* | (2022.01) |
| *H04L 67/12* | (2022.01) |

(52) U.S. Cl.
CPC .............. *H04L 41/08* (2013.01); *H04L 43/10* (2013.01); *H04L 67/12* (2013.01)

(58) Field of Classification Search
CPC .......... H04L 41/08; H04L 43/10; H04L 67/12
See application file for complete search history.

(56) References Cited

U.S. PATENT DOCUMENTS

| | | | | |
|---|---|---|---|---|
| 11,605,015 B2 * | 3/2023 | Anschuetz | ............. | G06N 3/065 |
| 12,293,263 B2 * | 5/2025 | Engel | ....................... | G06N 7/01 |
| 2025/0252286 A1 * | 8/2025 | Ganahl | .................. | G16C 20/50 |

(Continued)

OTHER PUBLICATIONS

Klishin, Andrei A. (2020). "Statistical Physics of Design." Doctoral dissertation, The University of Michigan.

(Continued)

*Primary Examiner* — Michael Won
(74) *Attorney, Agent, or Firm* — Harness, Dickey & Pierce, P.L.C.

(57) ABSTRACT
A computer system includes memory hardware configured to store computer-executable instructions, and a network of multiple tensor networks, each tensor network including multiple nodes. The computer system includes processor hardware configured to execute the computer-executable instructions to transmit a ping request from a first tensor network of the multiple tensor networks to a second tensor network of the multiple tensor networks, contract multiple nodes of the second tensor network in response to the ping request, to generate a probability distribution indicative of a state information of the second tensor network, transmit the probability distribution from the second tensor network to the first tensor network, and update the first tensor network to connect the probability distribution with at least one of multiple nodes of the first tensor network.

20 Claims, 12 Drawing Sheets

(56)          References Cited

U.S. PATENT DOCUMENTS

2025/0351058 A1*  11/2025  Singh ................... H04W 48/16

OTHER PUBLICATIONS

Klishin, Andrei A. et al. (2021). "Avoidance, adjacency, and association in distributed systems design." J. Phys. Complex.

Ran, Shi-Ju et al. (2020). "Tensor Network Contractions: Methods and Applications to Quantum Many-Body Systems." Lecture Notes in Physics, 964.

Manohar, Alexander D. (2023). "A Novel Through-Life Tensor Network and Ontological Commitment Inspired Approach for a Self-Adaptive Health Monitoring System for Crewless Vessels." Marine.

Radtke et al. Expert Knowledge Induced Logic Tensor Networks: A Bearing Fault Diagnosis Case Study. Proceedings of the 7th European Conference of the Prognostics and Health Management Society, 2022, pp. 421-431 [online], [retrieved on Jul. 28, 2025].

Retrieved from the Internet <https://phm-europe.org/wp-content/uploads/2022/06/ProPHME22.pdf>Abstract; p. 422.

Xu et al. A Review on Optimal Design of Fluid Machinery Using Machine Learning Techniques. Journal of Marine Science and Engineering, vol. 11, No. 5, Apr. 28, 2023 (Apr. 28, 2023), [ online], [retrieved on Jul. 28, 2025]. Retrieved from the Internet <https://www.mdpi.com/2077-1312/11/5/941>Abstract; Table 2; p. 10.

Pfeifer et al. Faster identification of optimal contraction sequences for tensor networks. Dec. 23, 2015 (Dec. 23, 2015), [ online], [retrieved on Jul. 28, 2025]. Retrieved from the Internet <https://arxiv.org/pdf/1304.6112>.

International Search Report and Written Opinion of the ISA issued in PCT/US2024/055136, mailed Aug. 13, 2025.

Arrigan et al., "The Importance of Ontological Commitment and Linguistics in Relation to the Elucidation of Design Requirements", IMC-2024, Jun. 2024, 11 pages.

Arrigan, et al. "A Novel Application of Tensor Networks for the Investigation of Design Optimization Tools in the Marine Domain", IMDC-2024, Jun. 2024, 19 pages.

* cited by examiner

SELF-ADAPTIVE HEALTH MONITORING SYSTEMS INCLUDING NETWORKS OF TENSOR NETWORKS

CROSS-REFERENCE TO RELATED APPLICATION

This application claims the benefit and priority of U.S. Provisional Application No. 63/597,921 filed on Nov. 10, 2023. The entire disclosure of the above application is herein incorporated by reference.

GOVERNMENT LICENSE RIGHTS

This invention was made with government support under N00014-17-1-2491 awarded by the U.S. Office of Naval Research. The government has certain rights in the invention.

FIELD

The present disclosure relates to self-adaptive health monitoring systems in including networks of tensor networks.

BACKGROUND

Automated vessels, such as ships, automobiles, airplanes, or other suitable types of vehicles, may be monitored by self-adaptive health monitoring systems. For example, an autonomous automotive vehicle may have maintenance performed by an autonomous system of a self-adaptive health monitoring system. The self-adaptive health monitoring system may include one or more suitable processes, such as a prognosis process for identifying when a fault has occurred, a diagnosis process for identifying the cause of the fault and a non-destructive corrective action, etc.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory hardware configured to store computer-executable instructions, and a network of multiple tensor networks, each tensor network including multiple nodes. The computer system includes processor hardware configured to execute the computer-executable instructions to transmit a ping request from a first tensor network of the multiple tensor networks to a second tensor network of the multiple tensor networks, contract multiple nodes of the second tensor network in response to the ping request, to generate a probability distribution indicative of a state information of the second tensor network, transmit the probability distribution from the second tensor network to the first tensor network, and update the first tensor network to connect the probability distribution with at least one of multiple nodes of the first tensor network.

In other features, the processor hardware is configured to contract the multiple nodes of the first tensor network and the probability distribution, to generate a contraction result indicative of a state information of the first tensor network based on contextual information of the second tensor network.

In other features, the processor hardware is configured to compare the contraction result to a specified nominal range associated with the first tensor network, and identify a failure condition in response to the contraction result being outside of the specified nominal range associated with the first tensor network.

In other features, the first tensor network includes at least one first physical component node and multiple sensor nodes connected with the at least one first physical component node, and the second tensor network includes at least one second physical component node and multiple sensor nodes connected with the at least one second physical component node. Other example embodiments may include tensor networks which process other types of information, such as other information sources besides sensors, other types of non-physical components (e.g., software components), etc.

In other features, at least one anchor is connected with at least one of the multiple sensor nodes of the first tensor network. In other features, at least one external leg is connected with at least one of the multiple sensor nodes of the first tensor network.

In other features, the first physical component node is a pump component, and the second physical component node is a pipe component.

In other features, the multiple nodes of the first tensor network include a pump current sensor node and a pump pressure sensor node, and the multiple nodes of the second tensor network include a pipe pressure sensor node and a pipe flowrate sensor node.

In other features, the processor hardware is configured to identify a failure condition according to the probability distribution, and the failure condition includes at least one of a leak condition and a clog condition.

In other features, the pump component and the pipe component are components of an autonomous ship vessel, and the network of tensor networks is configured to facilitate self-adaptive health monitoring for the autonomous ship vessel. Other example embodiments may include other suitable vessel implementations (e.g., airplanes, automobiles, etc.), or implementations of networks of tensor networks in non-vessel systems.

A method for executing a network of tensor networks includes transmitting a ping request from a first tensor network to a second tensor network, wherein the first tensor network and the second tensor network belong to a network of multiple tensor networks, and each of the multiple tensor networks includes multiple nodes, contracting multiple nodes of the second tensor network in response to the ping request, to generate a probability distribution indicative of a state information of the second tensor network, transmitting the probability distribution from the second tensor network to the first tensor network, and updating the first tensor network to connect the probability distribution with at least one of multiple nodes of the first tensor network.

In other features, the method includes contracting the multiple nodes of the first tensor network and the probability distribution, to generate a contraction result indicative of a state information of the first tensor network based on contextual information of the second tensor network.

In other features, the method includes comparing the contraction result to a specified nominal range associated with the first tensor network, and identifying a failure condition in response to the contraction result being outside of the specified nominal range associated with the first tensor network.

In other features, the first tensor network includes at least one first physical component node and multiple sensor nodes connected with the at least one first physical component node, and the second tensor network includes at least one second physical component node and multiple sensor nodes connected with the at least one second physical component node.

In other features, at least one anchor is connected with at least one of the multiple sensor nodes of the first tensor network. In other features, at least one external leg is connected with at least one of the multiple sensor nodes of the first tensor network.

In other features, the first physical component node is a pump component, and the second physical component node is a pipe component.

In other features, the multiple nodes of the first tensor network include a pump current sensor node and a pump pressure sensor node, and the multiple nodes of the second tensor network include a pipe pressure sensor node and a pipe flowrate sensor node.

In other features, the method includes identifying a failure condition according to the probability distribution, wherein the failure condition includes at least one of a leak condition and a clog condition.

In other features, the pump component and the pipe component are components of an autonomous ship vessel, and the network of tensor networks is configured to facilitate self-adaptive health monitoring for the autonomous ship vessel.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Systems Including Networks of Tensor Networks

Figure 1:
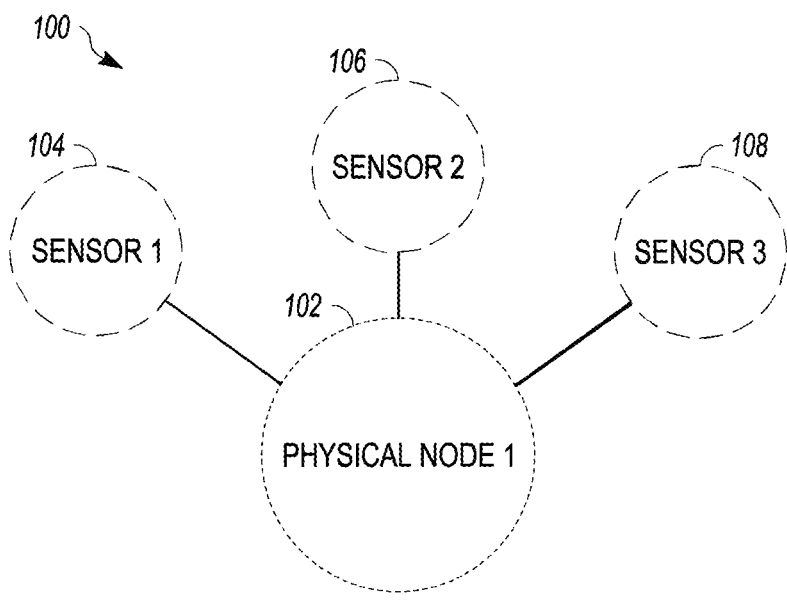
FIG. 1 is a functional block diagram of an example tensor network including a physical node and three sensor nodes.

Described herein are some example embodiments of systems including networks of tensor networks. For example, statistical physics may be applied to extract information about objects via tensor networks, with partition functions that describe state-to-state relationships within the system. Some example embodiments employ a network of tensor networks to decouple the scale of the environment from diagnostic decision-making. Individual tensor networks can be contracted by decentralized agents and can obtain important contextual information from connected components via the network of tensor networks.

In various implementations, a network of tensor networks may be used to enable self-adaptive health monitoring (SAHM) systems at scale, such as crewless vessels (e.g., smart ships or other vessels). For example, smart ships are vessels where navigation, maintenance, and operations may be performed autonomously. In particular, there is a desire to identify emergent failures, develop corrective actions, and identify emergent component relationships during the design process and during the vessel's life cycle. These are key components of SAHM systems that aim to maintain ship operations, the most critical step for achieving a truly crewless vessel.

In some example embodiments, a network of tensor networks framework enables SAHM systems by providing a generalized method for agents to interrogate their environment and determine corresponding diagnostic actions. For example, the framework may be used in, e.g., a cooling system where decentralized agents use the framework to accurately and quickly diagnose failures in real-time. The tensor networks may enable diagnostic agents to decouple their decision-making from the scale and complexity of the environment. The framework may be platform-independent, and enable scaling to large-scale systems and environments.

Statistical physics uses of statistical methods to describe physical phenomena, such as thermodynamics, superfluidity, and quantum statistics. Partition functions and tensor networks are two of the information structures used in statistical physics. Partition functions are used to describe the statistical properties of a system. When the partition function is evaluated, statistical averages are generated over the system's state space with respect to an objective function O. The objective function may take into account various system configurations $\{\alpha\}$ which can act as various "partitions" of the system, and return the cost for the system to be in that configuration. Each configuration $\alpha$ is evaluated by the objective function O and outputs the expected outcome of the system using that configuration.

The output of the objective function may be used to find the probability of a system being in a particular configuration $p_\alpha$. This probability is described below in the example Equation 1 below, where O and α are as described above and λ is the "relative importance of the corresponding design objective in driving the distribution", or the configuration pressure.

$$p_\alpha = \frac{1}{Z} e^{-\lambda O(\alpha)} \qquad \text{Equation 1}$$

The normalization constant Z is the summation over all possible system configurations {α}, and is described in the example Equation 2 below. Z may also be referred to as the partition function of the system.

$$Z = \sum_\alpha e^{-\sum_i \lambda_i O_i(\alpha)} \qquad \text{Equation 2}$$

The partition function Z may be used to examine the system and how various configurations affect it via soft constraints (e.g., configuration pressure λ) and hard constraints (e.g., system configurations α). The partition function contains a vast amount of information about the system, and it can be extracted by encoding the partition function into a tensor network. The tensor network may be evaluated by contracting it to obtain statistical information about the system.

In some example embodiments, a surrogate for energy may be utilized in the objective function. For example, the surrogate for energy may be a frequency-based calculation where edge_weight(x_i,y_j) gives a frequency between two systems in the tensor network while they are in states x and y:

$$T \cdot O(x_i, y_j) = T \cdot (1 - \text{edge\_weight}(x_i, y_j)) \qquad \text{Equation 3}$$

The objective function may define the energy contributed to the overall system when two systems are in specific states, where the energy surrogate is used by calculating a frequency for each of the physical component's states. The resulting partition function Z may be encoded into the tensor network.

In various implementations, a tensor network is centered around a physical component, such as a pump or a pipe. FIG. 1 illustrates a tensor network 100 including two types of nodes. A physical node 102 represents a physical component's state, and three sensor nodes 104, 106 and 108 represent sensor reading states. As explained further below, given sensor data (e.g., anchors), an agent may place an external leg on its physical node to obtain a probability distribution over its state space.

A tensor network may include a network of tensors whose edges represent contractions between them. A tensor is an algebraic object that represents physical relationships between two objects. An example is a stress tensor that relates the amount of stress that is being placed upon an object. In a mathematical sense, a tensor may be a "series of numbers labeled by N indexes, with N called the order of the tensor." For example, a scalar is a 0th order tensor, a vector is a 1st order tensor, and a matrix is a 2nd order tensor. A contraction between two tensors is a summation over a shared index. Therefore, a tensor network may represent a series of contractions between tensors. Tensor network contraction is commutative, so the order that the edges are contracted over does not affect the end result.

Figure 2:
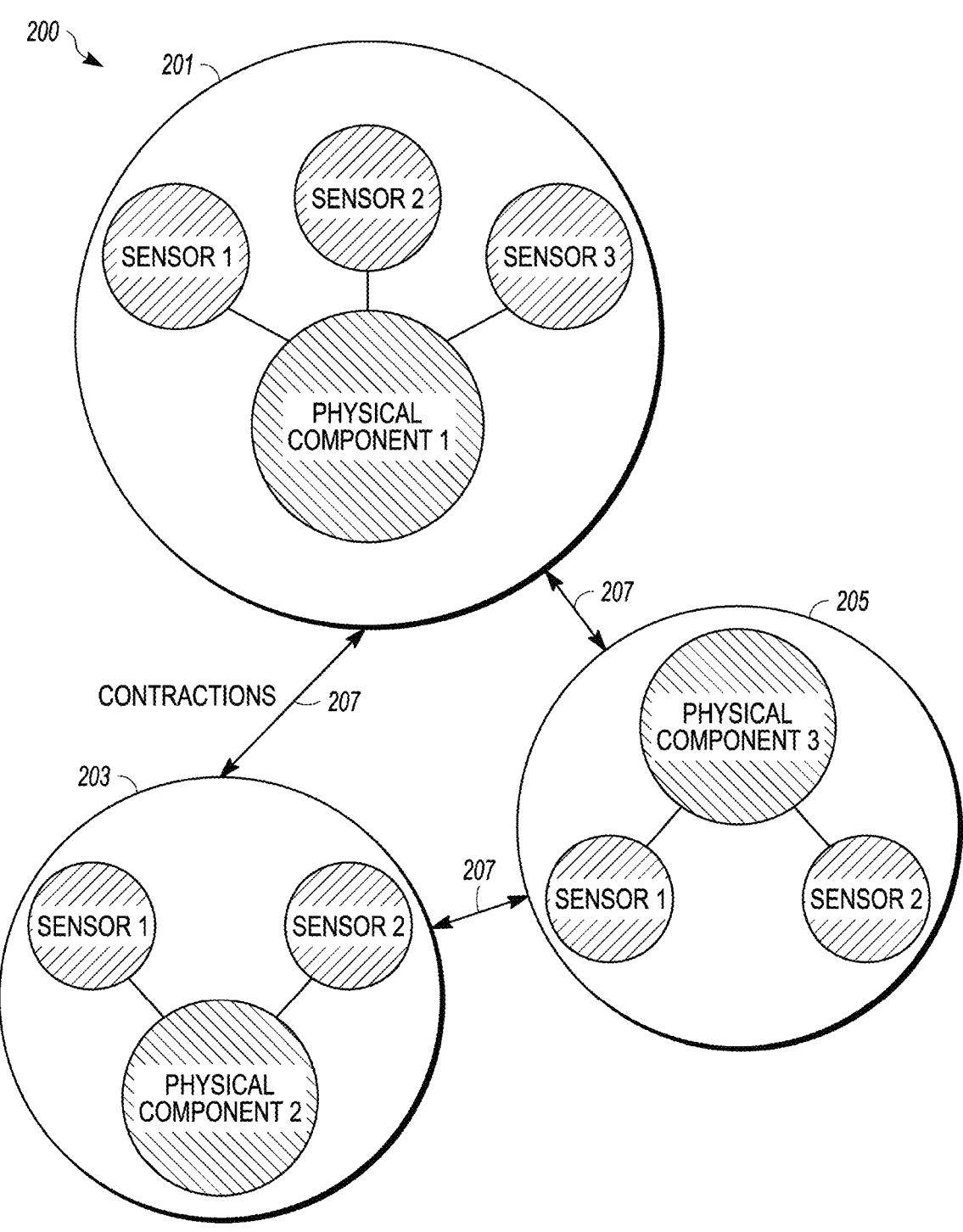
FIG. 2 is a functional block diagram of an example tensor network including three tensors with contractions represented between them.

FIG. 2 illustrates an example tensor network 200 including three tensors. A first tensor 201 includes a node for a first physical component, and three sensor nodes. A second tensor 203 includes a node for a second physical component, and two sensor nodes. A third tensor 205 includes a node for a third physical component, and two sensor nodes. The first tensor 201, the second tensor 203 and the third tensor 205 may have edges represented as contractions 207 between them.

In some examples, three pieces of information about a system may be used to construct the tensor network: the system's logical architecture, the system's physical architecture, and an objective function to define the state-to-state relationships between components in the system. First, a system consists of a series of components that have some relationships with other components. The logical architecture of the system is a network where the nodes are components of the system, and the edges represent the existence of relationships between components. Next, the physical architecture of the system is the state space of the system. Each component has a corresponding state space and the combination of all of the components' states forms the system's state space. The objective function defines the state-to-state relationships between components. From these three information structures, a tensor network may be constructed which can be used to investigate the system.

Figure 3:
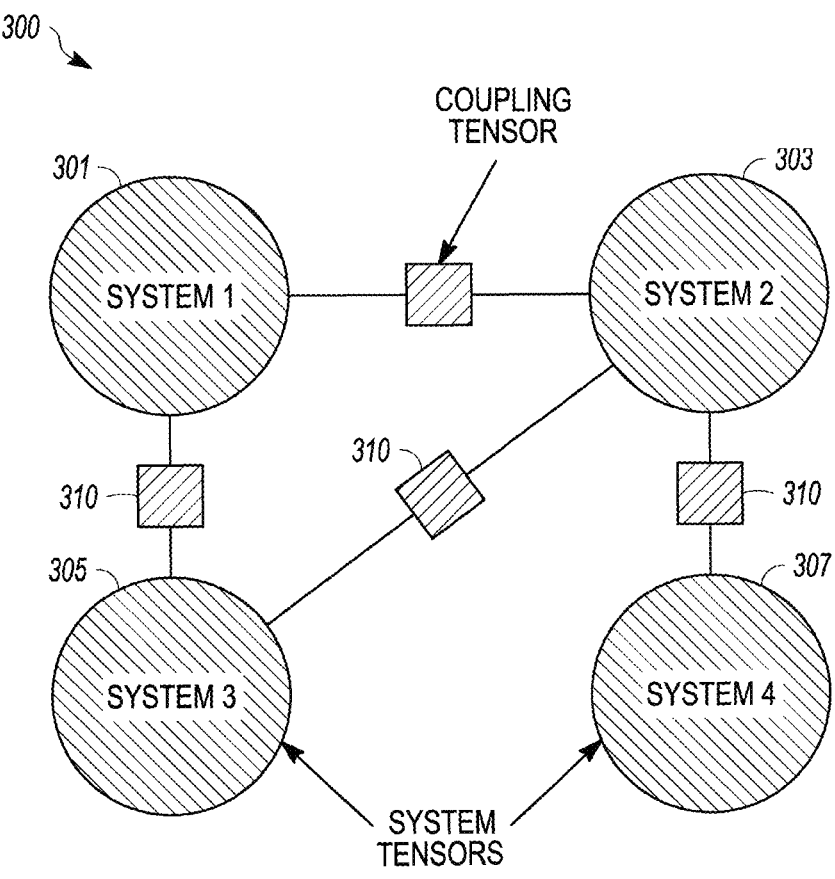
FIG. 3 is a functional block diagram of an example tensor network including four system tensors, which are linked via multiple coupling tensors.

There are several tools which may be used to modify the tensor network, including external legs, anchors, and modified couplings. Each of these tools modifies the tensor network in a unique way which facilitates interrogation of the tensor network to learn the statistical properties of the system. For example, the coupling between nodes may be directly modified. Normally, the objective function determines the values of the coupling tensor between two nodes, but the coupling may be modified to denote a special relationship between two nodes. FIG. 3 illustrates an example tensor network 300 including four system tensors 301, 303, 305 and 307, which are linked via multiple coupling tensors 310.

Figure 4:
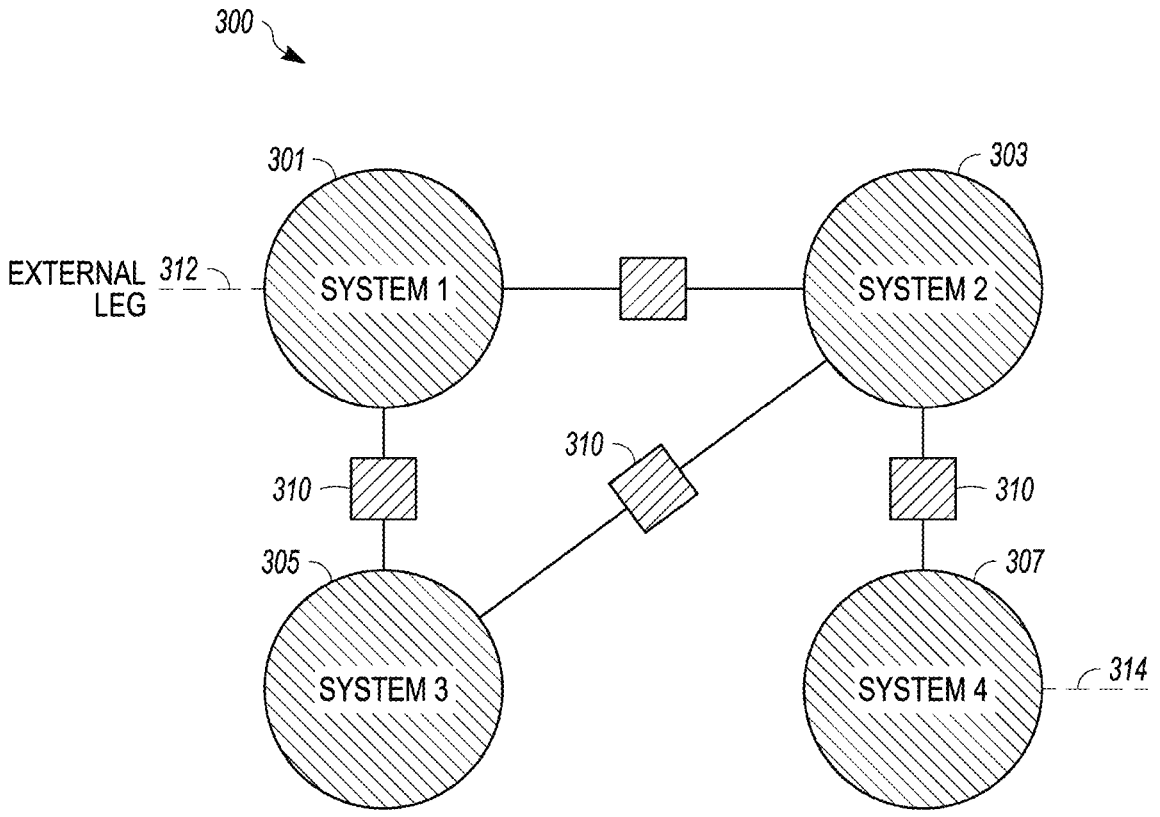
FIG. 4 is a functional block diagram of the example tensor network of FIG. 3, with two external legs connected to different system tensors.

As another option, external legs may be attached to the nodes in the tensor network to prevent the node's tensor from disappearing into the contraction. The remaining tensor provides an unnormalized probability distribution over the node's state space. External legs may also be attached to multiple nodes simultaneously. The result is an unnormalized joint probability over the state spaces of the nodes. FIG. 4 illustrates the example tensor network 300 with a first external leg 312 connected to the system tensor 301. A second external leg 314 is connected to the system tensor 307.

Figure 5:
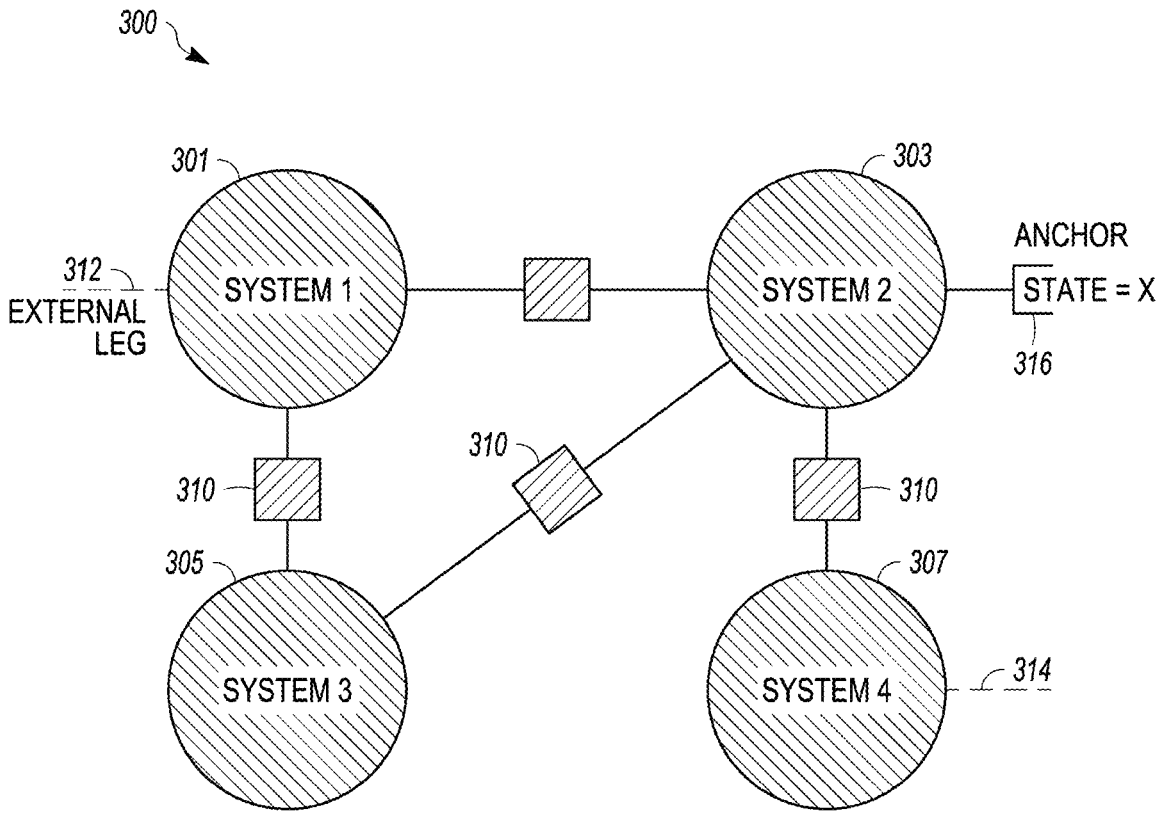
FIG. 5 is a functional block diagram of the example tensor network of FIG. 3, with an anchor connected to a system tensor.

As yet another option, anchors may be attached to a node's specific state. Anchors may represent a decision that has been made or information about the node that is already known. In this case, contraction of the tensor network is conditioned on the anchored node's state. Anchors may be placed on multiple nodes to condition the system on their states. One can place anchors on multiple nodes to condition the system on their states. FIG. 5 illustrates the example tensor network 300 with an anchor 316 connected to the system tensor 303.

Using external legs, anchors, and modified couplings, one can interrogate a system via its tensor network representation to generate ensembles of information about the state spaces of the various system's components for diagnosis.

Resulting information from contracting the tensor network over these various configurations may be used to diagnose a problem in the system.

In some example embodiments, mutual information may be used to group sensors together in the tensor network, to be anchored together. Mutual information measures how much information about a variable is gained by observing another. For example, some sensors may be related to one another, and as a result, may be anchored together to get the full context of their values. If all sensors are anchored together for each contraction, then the result of the contraction may be biased toward an incorrect state. However, if each sensor is anchored separately from one another, then additional context from other sensors may be missing from the contraction result.

If related sensors are not clustered together to be anchored at the same time, then the tensor network may sum over all possible states, given their frequency-based weightings. This may result in false negatives where the system indicates normal operation, since the weights for those states would be higher than those states indicating failure. Therefore, by clustering these sensors together, the agent can avoid potential false negatives by anchoring all sensors that are affected in a similar manner. For example, in the pipe agent, the pressure and flow rate sensors may be tied together because when the flow rate increases, the pressure generally increases as well, and as the flow rate decreases, the pressure also generally decreases. If these sensors were anchored and contracted over separately, then the contraction would sum over the weighted states of the other sensor and may be more likely to classify the pipe as nominal even if the pipe is in a failure state.

Mutual information may be calculated using the tensor network to generate probability distributions (e.g., by placing external legs on sensors). If the mutual information value between two sensors is higher than a threshold parameter (e.g., MI_threshold), then two sensors may be considered to be related to one another. Sensors may then be grouped together using hierarchical clustering.

Tensor network contraction is a quick operation due to it being a generalization of the inner product of vectors, and the hyper-optimized methods for computing those dot products (such as those included in the Python package PyTorch). Since tensor network contraction is commutative, the output does not depend on the order that the network is contracted. When two tensors are contracted, the number of remaining leftover indices determines the dimension of the resulting tensor. For example, if a 4th and 3rd dimensional tensor are contracted, then the resulting tensor is a 5th dimensional tensor. Hyper-optimized tensor contraction path-finding algorithms often rely on lattice-like grid structures, and even when they do not, their run time may be exponential on the scale of $O(2^E)$ where E is the number of edges in the network. Therefore, in order to use the tensor network to generate ensembles of information about systems, it is desirable to limit the number of edges in the network while retaining the capabilities of a larger network. The reduction of edges allows greedy pathfinding algorithms to find optimal contraction paths quickly. This effectively decouples the time and space requirements of the tensor network from the complexity of the system if the system's tensor network representation does not rely on a dense network.

In some example embodiments, a network of tensor networks may provide information contextualization. For example, physical components may not operate in isolation, and information from surrounding components may help contextualize information for a physical component. In various implementations, connected tensor networks may be pinged for a snapshot of the physical component's agent's belief of its state information.

For example, when one agent of a first tensor network pings another agent of a second tensor network, the agent of the second tensor network may a perform a series of contractions to determine its current state. The result of these contractions (e.g., a probability distribution over the physical component's state space) is passed back to the original agent and incorporated into its tensor network. What is passed between the tensor networks may be limited in data, but rich in information.

Figure 6A:
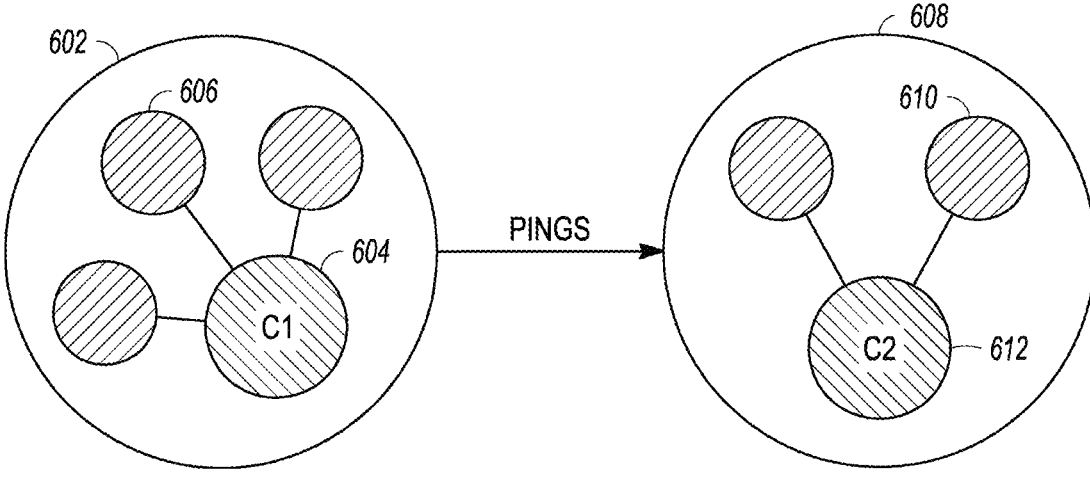
FIGS. 6A-6D illustrate an example process for communication between tensor networks in a network of tensor networks.

FIGS. 6A-6D illustrate an example process for communication between tensor networks in a network of tensor networks. As shown in FIG. 6A, a first tensor network 602 includes a first physical component 604 and three sensor components 606. A second tensor network 608 includes a second physical component 610 and two sensor components 612. In FIG. 6A, the first physical component 604 of the first tensor network 602 pings the second physical component 610 of the second tensor network 608.

Figure 6B:
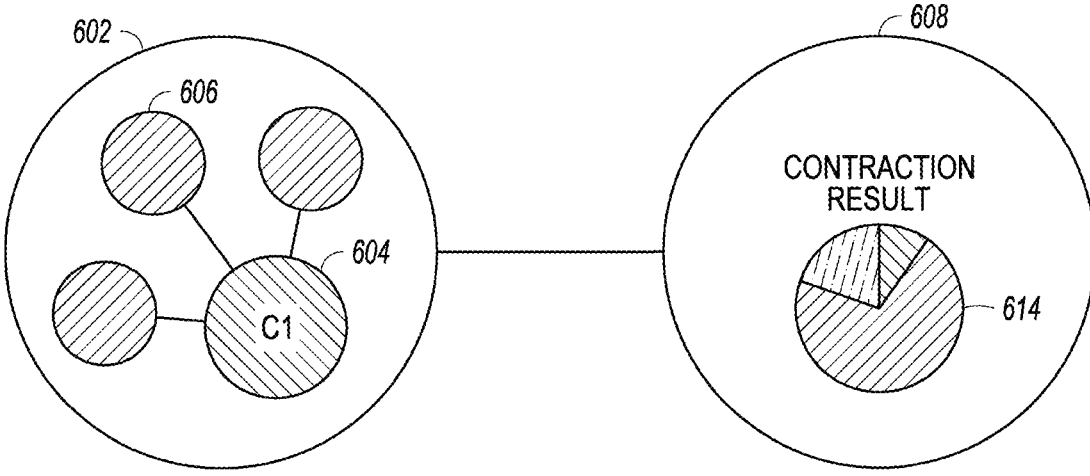

In FIG. 6B, the second tensor network 608 performs a series of contractions among the second physical component 610 and the two sensor components 612, to determine a state of the second tensor network 608. This process produces a contraction result 614 including state information for the second tensor network 608.

Figure 6C:
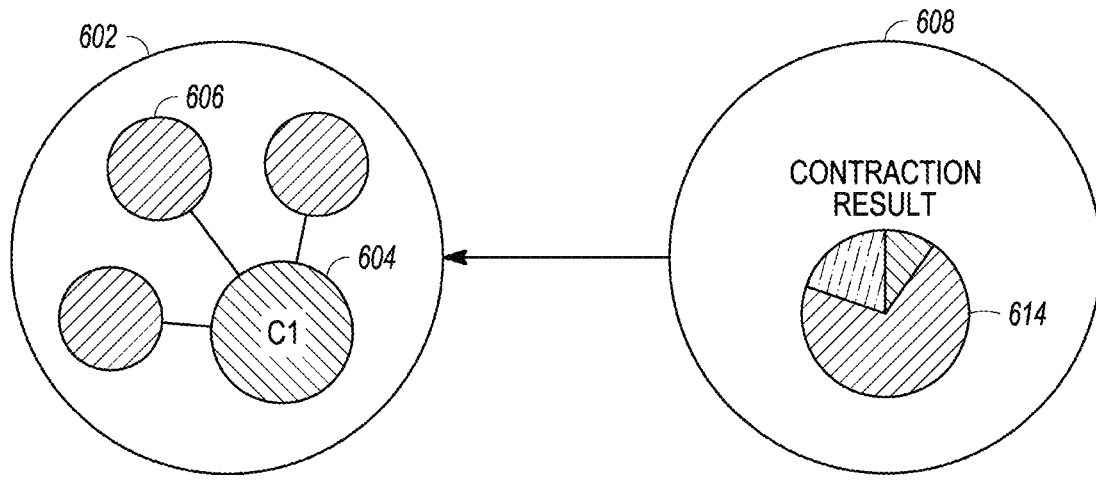
Figure 6D:
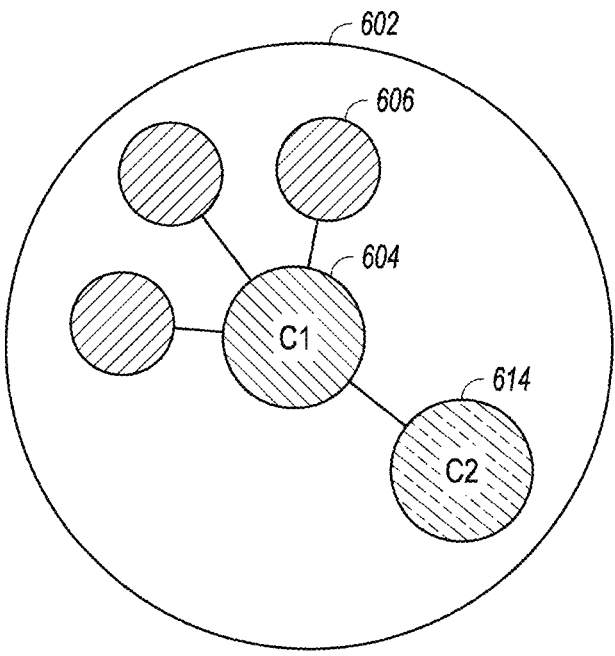

In FIG. 6C, the second tensor network 608 sends the contraction result 614 back to the first physical component 604 of the first tensor network 602. The contraction result 614 is incorporated into the first tensor network 602 as shown in FIG. 6D, such as via coupling between the contraction result 614 and the first physical component 604. Subsequent contractions of the first tensor network 602 may then be conditioned on the weighted average of the state of the second tensor network 608, as indicated by the transmitted contraction result 614.

A network of tensor networks may provide multiple advantages, such as a generalized and platform independent framework, facilitation of decision-making independent of platform scale, a lightweight communication protocol between decentralized agents, etc. Agents corresponding to individual tensor networks can use the network of tensor networks for diagnostic decision-making. For example, agents may use their own tensor network to gain information about the state of the system. Information may be contextualized by pinging connected agents in the network of tensor networks.

Some example embodiments described herein may implement a network of tensor networks on any suitable computing architecture, which may include one or more databases, system controllers, processors, servers, etc. For example, the network of tensor networks may be deployed in a computer network system, a standalone computer setup, may include a desktop computer, a laptop computer, a tablet, a smartphone, etc.

Data related to the network of tensor networks may be located in different physical memories within one or more databases, such as different random access memory (RAM), read-only memory (ROM), a non-volatile hard disk or flash memory, etc. In some implementations, data may be located in the same memory (such as in different address ranges of the same memory). In various implementations, data may be stored as structured or unstructured data in any suitable type of data store.

In various implementations, users may access the network of tensor networks via a user device. The user device may include any suitable user device for displaying text and receiving input from a user, including a desktop computer, a laptop computer, a tablet, a smartphone, etc. In various implementations, the user device may access the system directly, or may access system through one or more networks. Example networks may include a wireless network, a local area network (LAN), the Internet, a cellular network, etc.

Marine Cooling System Example

Figure 7:
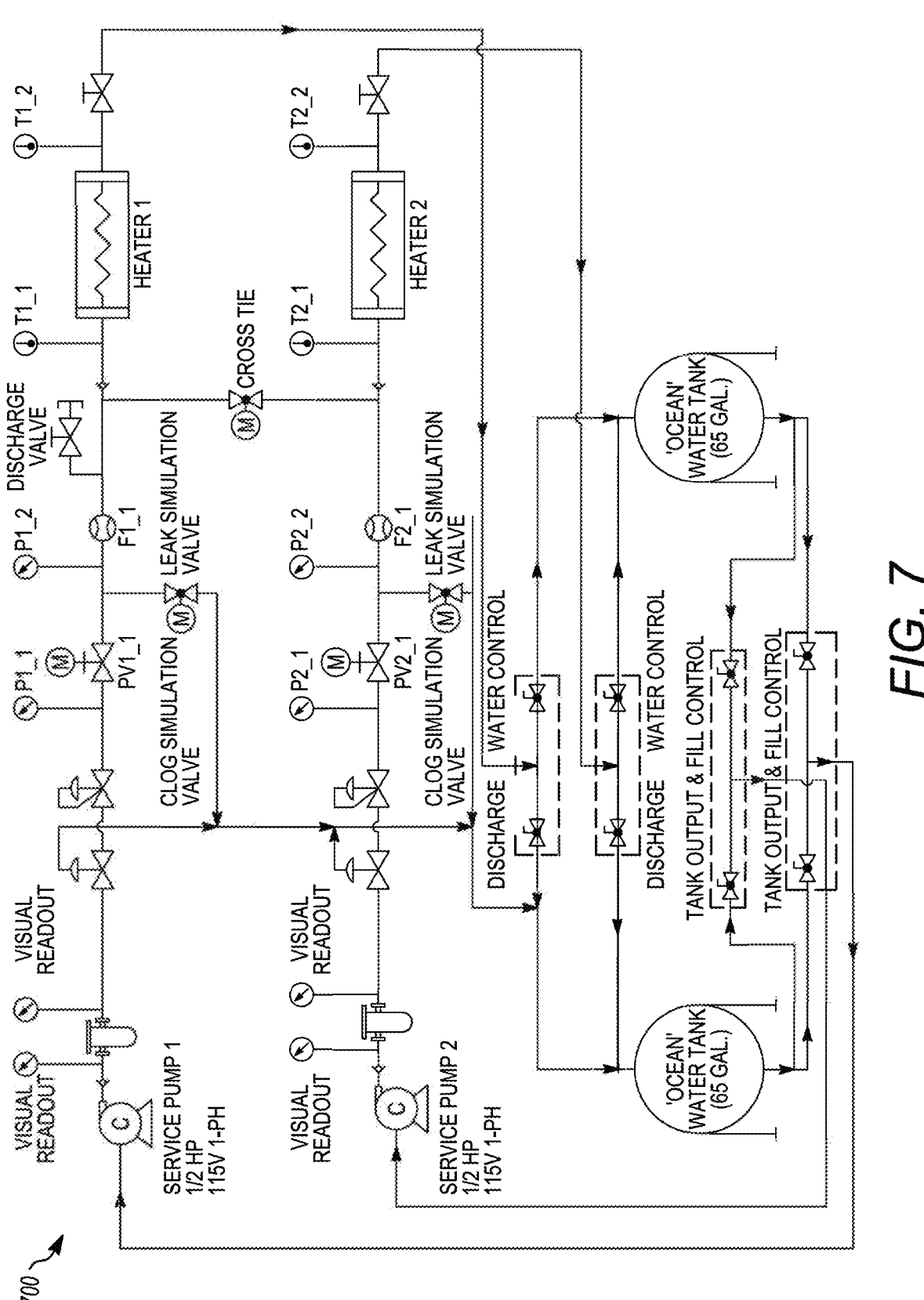
FIG. 7 illustrates an example marine cooling system, which may be controlled by a network of tensor networks.

FIG. 7 illustrates an example marine cooling system 700, which may be controlled by a network of tensor networks (such as for self-adaptive health monitoring on an autonomous ship). In a marine cooling system, a main process is circulating water to keep critical components cool.

A network of tensor networks may be generated to monitor the marine cooling system 700. For example, possible failure modes of the marine cooling system 700, such as leakage, clogging, or mechanical failure, may be monitored by a network of tensor networks. The network of tensor networks may represent relationships that exist between the different components and sensors in the system, such as the pressure indicators and flow meter.

A network of tensor networks may be configured to investigate the relation of pressure readings, flow measurements, or electrical current measurements and correlate the data to determine if a failure was occurring. Then, network of tensor networks may be able to monitor emergent system failure and alert the user with diagnostic information through agents of the network of tensor networks interacting with one another, and only communicating limited information. The agents would then come to a conclusion about the state of their individual components and also be able to present which other connected components and sensors potentially affected the conclusion.

For example, the agents of the network of tensor networks may be configured to examine the data coming in about the system, and determine if a failure had occurred. The agents then identify relevant sensor information to the failure to provide context to the agent's conclusion.

Figure 8:
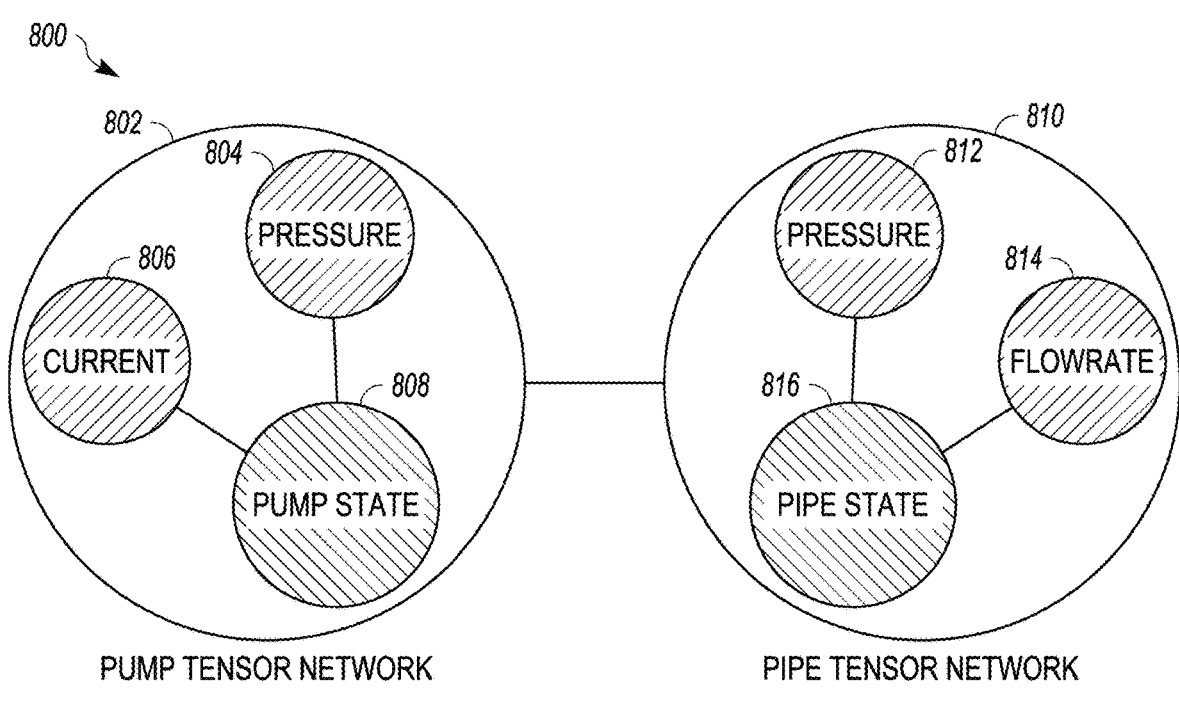
FIG. 8 illustrates a tensor network including two tensor networks connected together.

FIG. 8 illustrates a tensor network 800 including two tensor networks connected together. A pump tensor 802 includes a pressure node 804, a current node 806, and a controller node 808. A pipe tensor 810 includes a pressure node 812, and a flow node 814, and a controller node 816. Each of the nodes has a range for the nominal working values. Three states existed for the pump and pipe, respectively. The pump could be working nominally, clogged, or have a mechanical failure. The pipe could be working nominally, leaking, or clogged. The agents are able to interact with their respective tensor networks and are capable of pinging the other agent for information about themselves.

In the tensor network 800, two agents are present: one for the pump and one for the pipe. Each agent is responsible for determining the current state of their respective physical components, and they may operate under identical algorithms. The agents have direct access to the sensors that are connected to their physical components. For example, the agent of the pump tensor 802 has access to a current sensor which measures the amount of current being fed into the pump, and a pressure sensor which measures the water pressure exiting the pump. The agent of the pipe tensor 810 has access to a pressure sensor which measures the water pressure in the pipe, and a flow rate sensor which measures the flow rate of the water in the pipe.

Each agent may run its algorithm on a periodic basis, such as every 30 time steps where each time step is 0.03 seconds. Therefore, agents may run every 0.9 seconds, although other example embodiments may use other time steps, other periods of time, etc.

Calculated sensor averages may be compared against predetermined sensor value thresholds. If the values exceed the thresholds, then a failure may be determined as likely to have occurred, and an agent may be configured to run an algorithm to determine the state of their physical component. These thresholds may be specified by, for example, running the entire system at a nominal state for a period of time (e.g., 30 seconds), and extracting thresholds that 99% of the sensor values fall between.

In various implementations, the agents may be configured to have minimal interaction with each other, and may only obtain information by pinging the other agent. The agents of the tensor networks may use tensor network contractions to obtain probability distributions, to determine the likelihood of their physical components operating in a nominal or a failed state.

Figure 9:
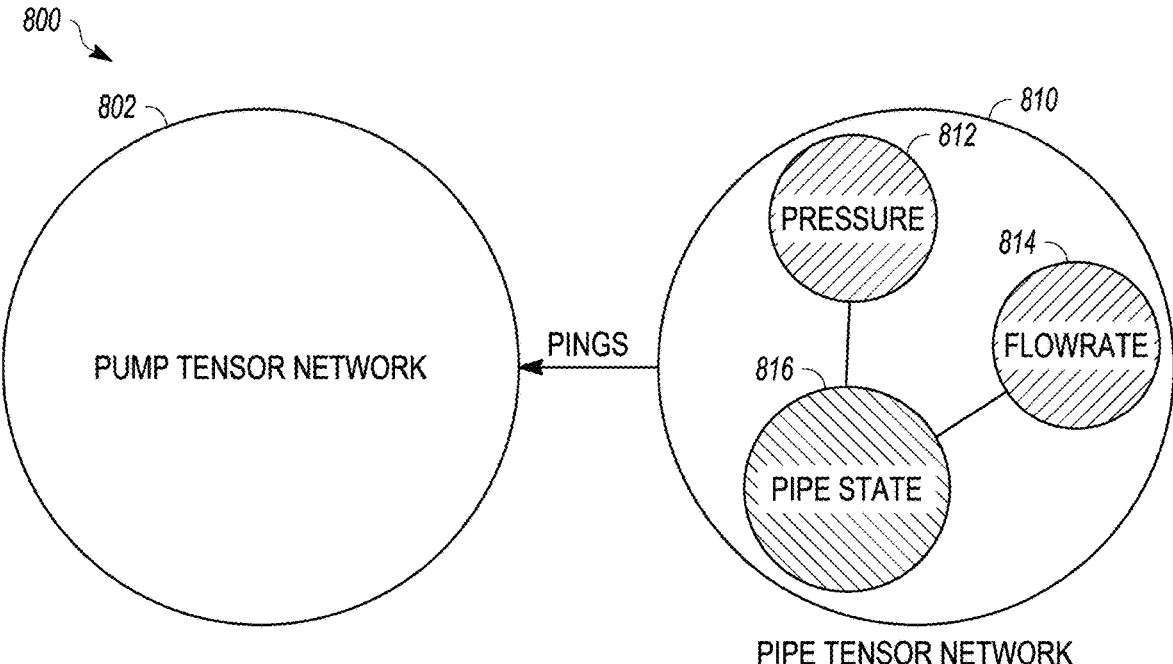
FIG. 9 illustrates an example of the pipe tensor network pinging a pump tensor network.
Figure 10:
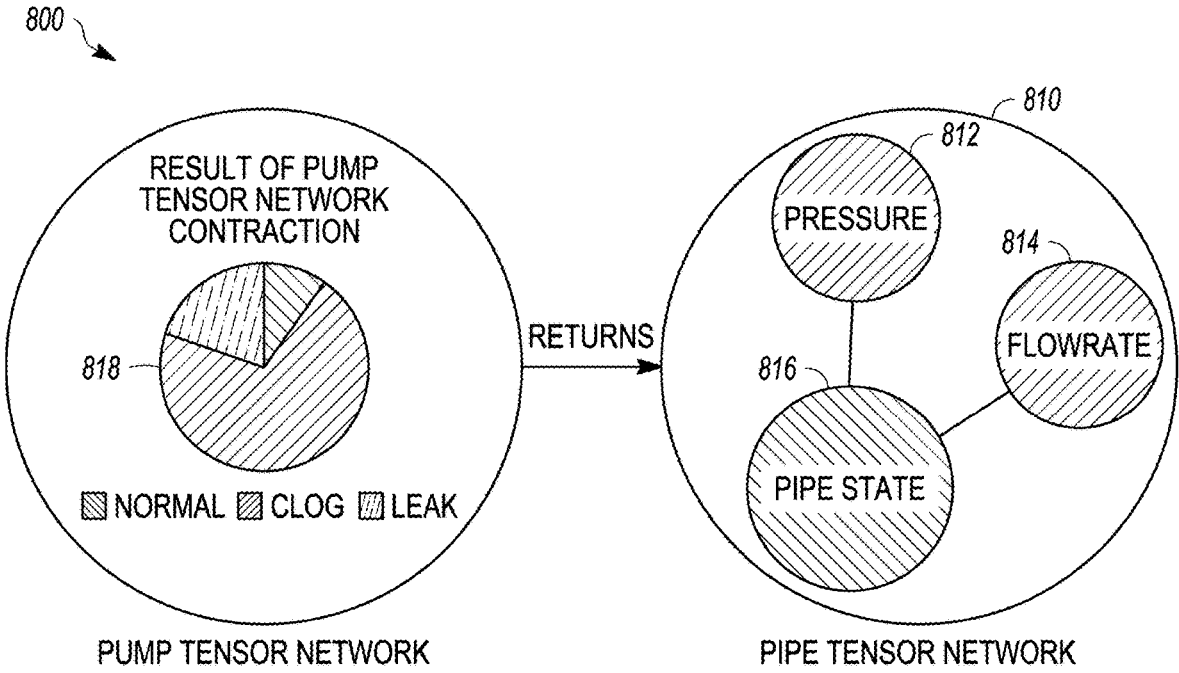
FIG. 10 illustrates a pump tensor performing a contraction in response to a ping request from the pipe tensor network of FIG. 9.

FIG. 9 illustrates an example of the pipe tensor network 808 pinging the pump tensor network 802, to obtain information about a state of the pump tensor network 802. As shown in FIG. 10, the pump tensor network 802 then performs a contraction of the pressure node 804, the current node 806, and the controller node 808, to generate a contraction result 818.

The contraction result 818 may be a probability distribution indicating a likely state of the pump tensor network 802, or a physical component of the pump tensor network 802. For example, the contraction result 818 may provide a probability that the pump is in a nominal state, a probability that the pump has a clog, and a probability that the pump has a leak. The pump tensor network 802 returns the contraction result 818 to the pipe tensor network 810, as shown in FIG. 10.

Figure 11:
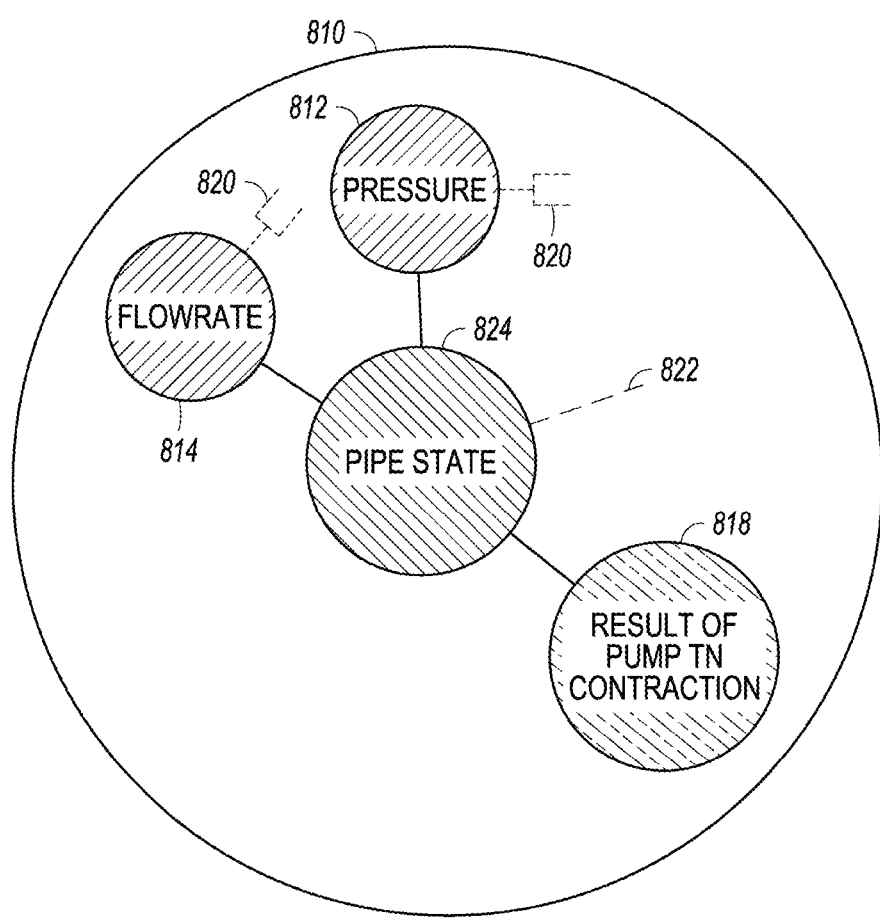
FIG. 11 illustrates the pipe tensor network incorporating the contraction result from the pump tensor network of FIG. 10.

The contraction result 818 is then incorporated into the pipe tensor network 810, as shown in FIG. 11, so subsequent contractions of the pipe tensor network 810 may be contextualized by the contraction result 818 of the pump tensor 802. The agent for the pipe tensor network 810 may place anchors 820 on its sensors, and an external leg 822 on the state node 824. In this example, the contraction result of the pipe tensor network 802 may be a probability distribution of the pipe state based on the pipe pressure, the pipe flowrate, and a contraction result 818 of the pump tensor network 802 to provide contextual information.

As described above, the result of pinging a tensor network may be a probability distribution over a state space of the component of the tensor network. Each component may maintain information on how its various states are related to states of other connected components. For example, when a pump is clogged, the pipe may be clogged also. When a pump is leaking, the pipe may be considered as leaking also.

Relationships between states of tensor networks may be represented as frequency-based coupling tensors, similar to a coupling tensor between sensors and a physical component. The result of a ping may be multiplied over a coupling tensor to weight the coupling tensor towards specific states. Subsequent contractions of the tensor network contract over the coupling tensor, which may effectively condition the result on the state distribution of connected components.

Figure 12:
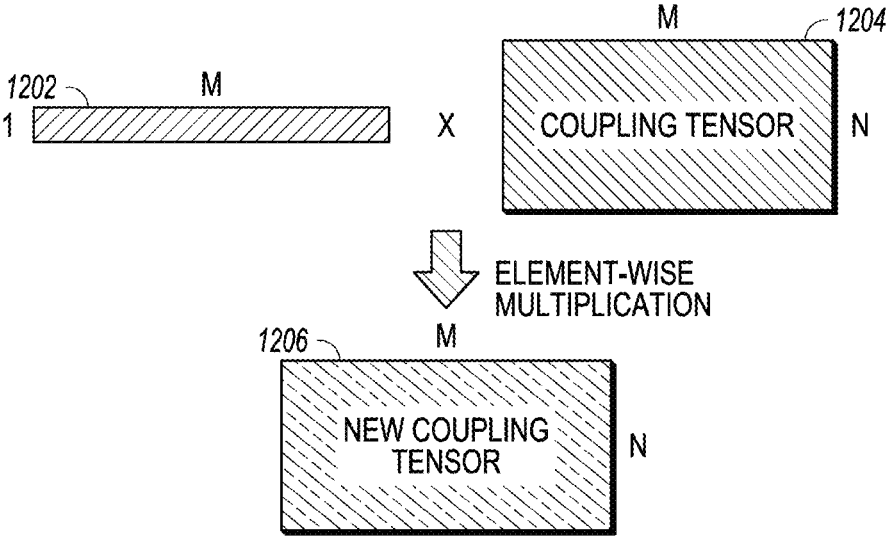
FIG. 12 is a block diagram illustrating an example process for incorporating ping results in a tensor network.

FIG. 12 illustrates an example of incorporating ping results from contraction of a tensor network, where a 1×M array 1202 is multiplied with an N×M coupling tensor 1204, via element-wise multiplication. The result is a new N×M coupling tensor 1206.

Other Example Use Cases

One or more networks of tensor networks, such as various example tensor networks described herein, may be used in any suitable applications for monitoring of systems, control of system components, determining or obtaining system information, etc. For example, one or more networks of tensor networks may be used for real-time decision making applications, such as autonomous vehicles (e.g., cars, ships, air vehicles).

As an example, for sensor fusion, an agent may integrate data from various sensors (e.g., LiDAR, radar, cameras) to build a comprehensive understanding of the environment. For path planning, a tensor network may use probabilistic predictions of object movements, where the agent calculates optimal paths to avoid collisions and reach a destination efficiently. In real-time, an agent may implement decision-making to determine actions based on predicted future states. The tensor networks may operate in complex environments, such as handling challenging scenarios were nonlinearities exist like wave surfing (e.g., broaching). Example tensor networks may facilitate human-vehicle interaction by understanding and predicting pedestrian behavior, anticipating their actions, and ensuring safety. The tensor networks may use ethical decision making, such as navigating moral dilemmas like choosing between hitting a pedestrian or swerving into oncoming traffic, autonomous weapon launch, etc. In fleet management, tensor networks may optimize routes for multiple vehicles (e.g., marine or land).

In gaming artificial intelligence (AI), tensor networks may perform game state analysis where an agent processes game data (e.g., player positions, enemy locations, item availability) to understand the current situation. The tensor networks may predict opponent behavior, such as by analyzing opponent actions to predict their future moves. Example tensor networks may implement decision making by having an agent select the best actions (e.g., attack, defend, move, use items) based on probabilistic outcomes. The agent may implement adaptation by learning from game outcomes and adjusting its strategies accordingly. Tensor networks may facilitate multiplayer interactions, such as by coordinating with human and AI teammates, anticipating opponent strategies, and adapting gameplay accordingly. Tensor networks may operate in dynamic environments, such as by responding to changing game conditions, such as terrain, weather, and enemy behavior, and enhance player experiences by creating engaging and challenging gameplay experiences for human players.

In some examples, networks of tensor networks may be sued for anomaly detection and predictive maintenance, such as industrial internet of things (IoT) applications. For example, an agent may implement sensor data analysis by collecting data from sensors on machines (e.g., temperature, vibration, pressure) to monitor equipment health, and may implement anomaly detection by identifying unusual patterns in sensor data that indicate potential malfunctions. Example tensor networks may facilitate predictive maintenance, where the agent predicts when equipment is likely to fail, and may facilitate maintenance scheduling by optimizing maintenance schedules to minimize downtime and costs. In some examples, tensor networks may facilitate root cause analysis by identifying the underlying causes of equipment failures to prevent recurrence, and may facilitate proactive maintenance by scheduling maintenance based on the predicted health of equipment, to optimize resource allocation. Tensor networks may implement a digital twin by creating virtual representations of physical assets for simulation and analysis, and may facilitate supply chain optimization by predicting supply chain disruptions and implementing contingency plans.

In some examples, networks of tensor networks may be used in natural language processing and conversational AI applications, such as chatbots. For example, tensor networks may implement natural language understanding by having the agent interpret user queries and identity user intent by accessing various models, and may implement dialogue management by maintaining conversation context and generating appropriate responses. Tensor networks may facilitate knowledge base access by retrieving relevant information from various knowledge bases to answer user questions (e.g., ChatGPT, Gemini, etc.). Tensor networks may implement personalization by adapting responses based on user preferences and history, may implement emotional intelligence by understanding and responding to user emotions to build empathy, and may implement personality modeling by creating chatbots with distinct personalities to enhance user engagement. Some example tensor networks may facilitate multilingual support by enabling communication across different languages and cultures, and knowledge graph integration by leveraging knowledge graphs for improved information retrieval and response generation.

In example language translation applications, a network of tensor networks may perform text analysis by analyzing the source text to identify grammatical structure and meaning, and may implement a translation model by applying probabilistic models to generate multiple translation candidates. Example tensor networks may facilitate contextual understanding by considering the context of the text to select the most appropriate translation, may perform post-editing by refining the translated text for accuracy and fluency, and may facilitate dialect and accent handling by accurately translating variations of languages. Some tensor networks may facilitate machine translation evaluation by developing metrics to assess the quality of machine-generated translations, may implement translation memory by utilizing translation history to improve consistency and efficiency, and may facilitate neural machine translation by exploring advanced neural network architectures for enhanced translation quality.

In some examples, a network of tensor networks may be used in recommendation system applications, such as product recommendations. For example, tensor networks may perform user behavior analysis by an agent analyzing agent user purchase history, browsing behavior, and demographics to understand preferences. Tensor networks may implement item similarity to identify products similar to those the user has shown interest in. In some examples, tensor networks may perform recommendation generation by generating a list of recommended products based on probabilistic models of user preferences. In a cold start problem, tensor networks may provide recommendations for new users with limited data. Example tensor networks may implement serendipity by suggesting unexpected but relevant items to expand user horizons, group recommendations by recommending products for multiple users with shared interests, and explainable AI by providing transparent explanations for recommendations to build trust.

In example content recommendation applications, a network of tensor networks may facilitate content analysis where an agent analyzes content features (e.g., keywords, genres, authors) to understand its characteristics, may builds user profiles based on content consumption history and preferences, and may implement recommendation generation by suggesting content that matches the user's profile and interests. In some examples, tensor networks may balance recommending familiar content with introducing new items, and may provide contextual recommendations by suggesting content based on the user's current context (e.g., time, location, mood). Example tensor networks may facilitate diversity and inclusion by recommending content from diverse sources and perspectives, may protect against adversarial attacks by protecting recommendation systems from malicious manipulation, and may facilitate hybrid recommendation systems by combining different recommendation approaches for improved accuracy.

In some examples, a network of tensor networks may be used in resource optimization applications, such as energy management. For example, tensor networks may facilitate demand forecasting where an agent predicts energy consumption based on historical data and weather forecasts, and facilitate supply optimization by managing energy generation from various sources (e.g., renewable, fossil fuels) to meet demand. Example tensor networks may facilitate price optimization by adjusting energy prices in real-time to balance supply and demand, may contribute to maintaining grid stability by optimizing energy flow, and may facilitate demand response by encouraging consumers to adjust energy consumption based on real-time pricing. In some examples, tensor networks may be used with microgrids by optimizing energy management for localized power systems, may be used with renewable energy integration by maximizing the utilization of renewable energy sources, and may facilitate energy storage by managing energy storage systems for peak shaving and grid stabilization.

In example supply chain management applications, some tensor networks may assist with demand forecasting where an agent predicts product demand based on historical sales data and market trends, and inventory management by optimizing inventory levels to minimize costs and stockouts. In some examples, tensor networks may facilitate transportation optimization by planning efficient routes for delivery vehicles, and may facilitate risk management by identifying potential supply chain disruptions and developing contingency plans. Some example tensor networks may provide supply chain visibility by tracking the movement of goods and materials in real-time, and may facilitate inventory optimization by using advanced forecasting techniques to minimize stockouts and overstocks. Example tensor networks may facilitate transportation routing by optimizing delivery routes and considering factors like traffic, weather, and driver availability, and may facilitate sustainability by incorporating environmental and social factors into supply chain decisions.

In some examples, a network of tensor networks may be used in scientific modeling and simulation applications, such as climate modeling. For example, tensor networks may implement data integration by combining data from various sources (e.g., temperature, precipitation, atmospheric composition) to build a comprehensive model. Example tensor networks may facilitate scenario simulation by simulating different climate scenarios based on varying parameters. and may perform impact assessment by evaluating the potential impacts of climate change on different regions and ecosystems. In some examples, tensor networks may facilitate policy evaluation by assessing the effectiveness of different climate policies, and may implement regional climate modeling by simulating climate patterns at a finer scale for more accurate predictions. Example tensor networks may assess climate change impacts by assessing the effects of climate change on various sectors (e.g., agriculture, health, infrastructure), may facilitate uncertainty quantification by estimating the range of possible outcomes due to model limitations and data uncertainty, and may perform climate policy evaluation by analyzing the effectiveness of different climate mitigation and adaptation strategies.

Tensor Network Ping Communication Processes

Figure 13:
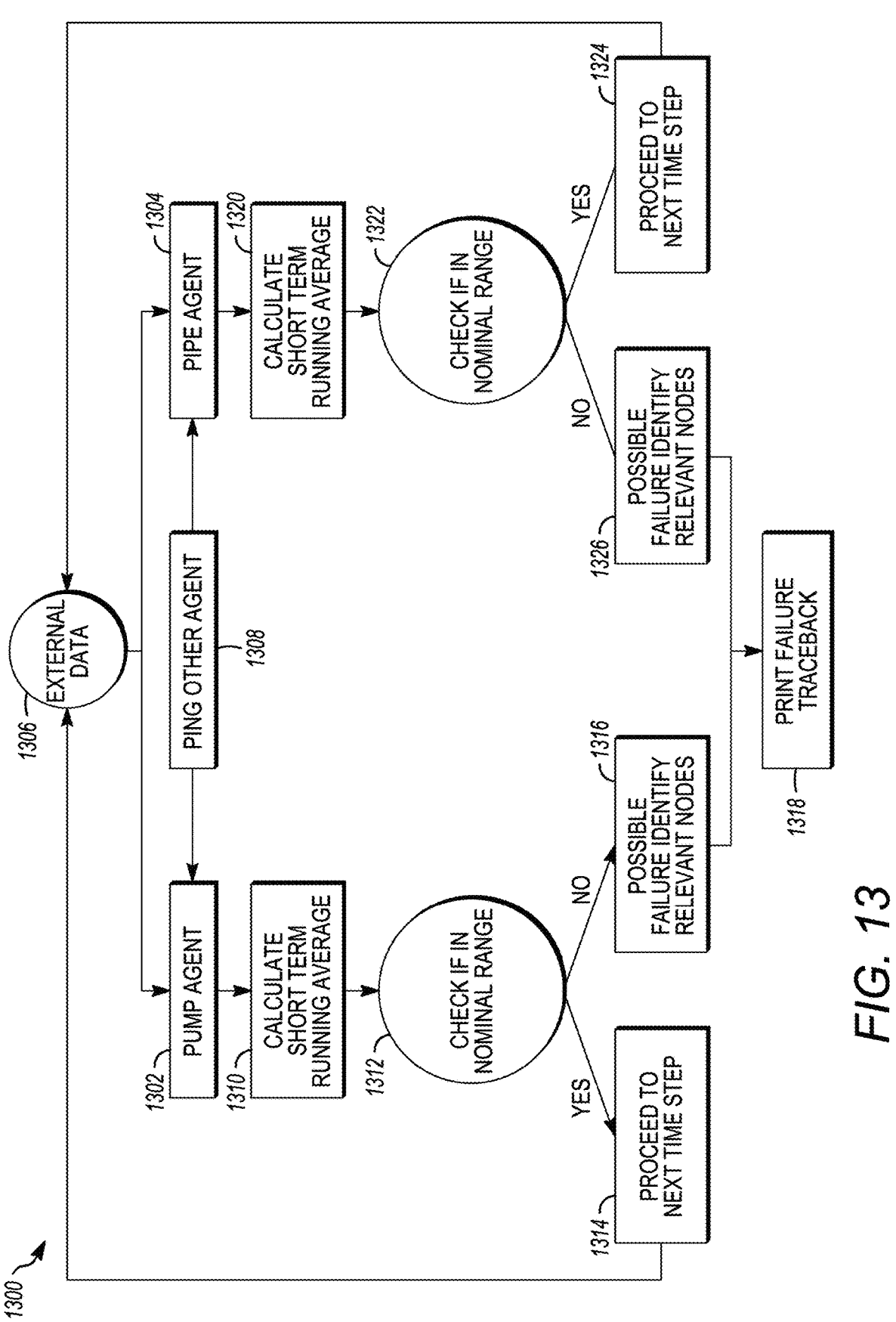
FIG. 13 is a flowchart depicting an example process for agents of a network of tensor networks.

FIG. 13 illustrates an example process 1300 for agents of the tensor network 800 of FIG. 8. At 1302, the pump agent (e.g., an agent of the pump tensor network 802) accesses external data 1306, such as data from sensors of the pump tensor network 802.

At 1304, the pipe agent 1304 (e.g., an agent of the pipe tensor network 810) accesses external data 1306, such as data from sensors of the pipe tensor network 810. The pump agent 1302 and the pipe agent 1304 may ping each other at 1308, to obtain a contraction result probability distribution from the other tensor network for contextual information.

At 1310, the pump agent calculates a short term running average, such as a short term running average of state information of the pump, of sensor data from sensors associated with the pump, of a contraction result of nodes of the tensor network associated with the pump, etc.

At 1312, the pump agent checks whether the running average is within a nominal range. For example, a nominal range of values for the running average may be specified, such as a range of 95%, 99%, etc. of values obtained during a specified runtime of the system (e.g., for thirty minutes, for one hour, for one day, etc.).

If the short term running average is within the nominal range at 1312, the process proceeds to a next tine step at 1314, to obtain additional external data 1306 (such as via sensors associated with the pump). If the short term running average is outside of the nominal range at 1312, the process proceeds to 1316 to identify relevant nodes of a possible failure (e.g., identifying whether a failure occurred due to a leak, due to a clog, etc.). The process then prints a pump failure traceback at 1318.

At 1320, the pipe agent calculates a short term running average, such as a short term running average of state information of the pipe, of sensor data from sensors associated with the pipe, of a contraction result of nodes of the tensor network associated with the pipe, etc.

At 1322, the pipe agent checks whether the running average is within a nominal range. If the short term running average is within the nominal range at 1322, the process proceeds to a next time step at 1324, to obtain additional external data 1306 (such as via sensors associated with the pipe).

If the short term running average is outside of the nominal range at 1322, the process proceeds to 1326 to identify relevant nodes of a possible failure (e.g., identifying whether a pipe failure occurred due to a leak, due to a clog, etc.). The process then prints a pipe failure traceback at 1318.

Below is pseudo code for an example algorithm which may be executed by an agent of each tensor network (TN):

```
Require: Tensor Network (TN), Connected Agents
    Ping Connected Agents
    Incorporate ping results into TN
```

-continued

```
Cluster component sensors based on mutual information
potential_failures ← | |
for each cluster of sensors do
    Anchor sensor values in TN
    Place external leg on physical component state node in TN
    Contract TN
    Record failures in potential_failures
end for
failures ← | |
for failure in potential_failures do
    Anchor sensors corresponding to failure
    Place external leg on physical component state node in TN
    Contract TN
    Add failure probability to failures
end for
return failures
```

In some example embodiments, statistical process control (SPC) may be used to determine when to run a contraction in the network. Example SPC methods may include, but are not limited to, detecting mean shifts and anomalies in sensor data. When a mean shift or sensor anomaly is triggered, the agents may reweight their edge weights within their tensor networks, and perform a contraction on the network to determine if a failure occurred.

For example, edge weights in coupling tensors for leak states may be much higher than corresponding clog states (e.g., in a pump and pipe system), and failures may cause a mean shift over time or a sudden value shift at a point in time. SPC methods may be used to track data over time and assign failure criteria. A control chart plots sample averages over time, and may be used to detect mean shifts (e.g., by iterating over possible split points to check whether a mean has shifted), and/or anomalies (e.g., where there is no mean shift and the average value is outside of three standard deviations, for example).

For each failure state, a failure may be tagged as associated with a mean shift or an anomaly, such as a clog having a slow moving response being associated with a mean shift, and a leak having a rapid response being associated with an anomaly. At each time step, agents in the tensor networks may check their sensors for a mean shift or anomaly. According to the detected failure type, edge weights in the coupling tensor may be scaled up by a parameter (e.g., edge_data_scaling).

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
memory hardware configured to store computer-executable instructions, and a network of multiple tensor networks, each tensor network including multiple nodes; and
processor hardware configured to execute the computer-executable instructions to:
transmit a ping request from a first tensor network of the multiple tensor networks to a second tensor network of the multiple tensor networks;
contract multiple nodes of the second tensor network in response to the ping request, to generate a probability distribution indicative of a state information of the second tensor network;
transmit the probability distribution from the second tensor network to the first tensor network; and
update the first tensor network to connect the probability distribution with at least one of multiple nodes of the first tensor network.

2. The computer system of claim 1, wherein the processor hardware is configured to contract the multiple nodes of the first tensor network and the probability distribution, to generate a contraction result indicative of a state information of the first tensor network based on contextual information of the second tensor network.

3. The computer system of claim 2, wherein the processor hardware is configured to:
compare the contraction result to a specified nominal range associated with the first tensor network; and
identify a failure condition in response to the contraction result being outside of the specified nominal range associated with the first tensor network.

4. The computer system of claim 1, wherein:
the first tensor network includes at least one first physical component node and multiple sensor nodes connected with the at least one first physical component node; and
the second tensor network includes at least one second physical component node and multiple sensor nodes connected with the at least one second physical component node.

5. The computer system of claim 4, wherein at least one anchor is connected with at least one of the multiple sensor nodes of the first tensor network.

6. The computer system of claim 4, wherein at least one external leg is connected with at least one of the multiple sensor nodes of the first tensor network.

7. The computer system of claim 4, wherein:

the first physical component node is a pump component; and the second physical component node is a pipe component.

8. The computer system of claim 7, wherein:

the multiple nodes of the first tensor network include a pump current sensor node and a pump pressure sensor node; and the multiple nodes of the second tensor network include a pipe pressure sensor node and a pipe flowrate sensor node.

9. The computer system of claim 8, wherein:

the processor hardware is configured to identify a failure condition according to the probability distribution; and the failure condition includes at least one of a leak condition and a clog condition.

10. The computer system of claim 8, wherein:

the pump component and the pipe component are components of an autonomous ship vessel; and the network of tensor networks is configured to facilitate self-adaptive health monitoring for the autonomous ship vessel.

11. A method for executing a network of tensor networks, the method comprising:

transmitting a ping request from a first tensor network to a second tensor network, wherein the first tensor network and the second tensor network belong to a network of multiple tensor networks, and each of the multiple tensor networks includes multiple nodes;

contracting multiple nodes of the second tensor network in response to the ping request, to generate a probability distribution indicative of a state information of the second tensor network;

transmitting the probability distribution from the second tensor network to the first tensor network; and updating the first tensor network to connect the probability distribution with at least one of multiple nodes of the first tensor network.

12. The method of claim 11, further comprising contracting the multiple nodes of the first tensor network and the probability distribution, to generate a contraction result indicative of a state information of the first tensor network based on contextual information of the second tensor network.

13. The method of claim 12, further comprising:

comparing the contraction result to a specified nominal range associated with the first tensor network; and identifying a failure condition in response to the contraction result being outside of the specified nominal range associated with the first tensor network.

14. The method of claim 11, wherein:

the first tensor network includes at least one first physical component node and multiple sensor nodes connected with the at least one first physical component node; and the second tensor network includes at least one second physical component node and multiple sensor nodes connected with the at least one second physical component node.

15. The method of claim 14, wherein at least one anchor is connected with at least one of the multiple sensor nodes of the first tensor network.

16. The method of claim 14, wherein at least one external leg is connected with at least one of the multiple sensor nodes of the first tensor network.

17. The method of claim 14, wherein:

the first physical component node is a pump component; and the second physical component node is a pipe component.

18. The method of claim 17, wherein:

the multiple nodes of the first tensor network include a pump current sensor node and a pump pressure sensor node; and the multiple nodes of the second tensor network include a pipe pressure sensor node and a pipe flowrate sensor node.

19. The method of claim 18, further comprising identifying a failure condition according to the probability distribution, wherein the failure condition includes at least one of a leak condition and a clog condition.

20. The method of claim 18, wherein:

the pump component and the pipe component are components of an autonomous ship vessel; and the network of tensor networks is configured to facilitate self-adaptive health monitoring for the autonomous ship vessel.

* * * * *